United States Patent
Reichart et al.

(10) Patent No.: US 9,395,220 B2
(45) Date of Patent: Jul. 19, 2016

(54) MAGNETIC INDUCTIVE FLOW METER HAVING CAPACITIVE MEASURING DEVICE FOR EMPTY PIPE DETECTION

(71) Applicant: IFM ELECTRONIC GMBH, Essen (DE)

(72) Inventors: Walter Reichart, Fronreute (DE); Christian Kreisel, Kressbronn (DE); Ralf Kriesen, Amtzell (DE); Markus Körber, Immenstaad (DE); Sebastian Liehr, Wasserburg (DE); Werner Hoch, Tettnang (DE)

(73) Assignee: IFM ELECTRONIC GMBH (DE)

( * ) Notice: Subject to any disclaimer, the term of this patent is extended or adjusted under 35 U.S.C. 154(b) by 0 days.

(21) Appl. No.: 14/405,309

(22) PCT Filed: Jul. 23, 2013

(86) PCT No.: PCT/EP2013/065476
§ 371 (c)(1),
(2) Date: Dec. 3, 2014

(87) PCT Pub. No.: WO2014/019888
PCT Pub. Date: Feb. 6, 2014

(65) Prior Publication Data
US 2015/0168188 A1   Jun. 18, 2015

(30) Foreign Application Priority Data
Jul. 31, 2012  (DE) .......................... 10 2012 213 507

(51) Int. Cl.
*G01F 1/58* (2006.01)
*G01F 15/00* (2006.01)
*G01F 15/14* (2006.01)

(52) U.S. Cl.
CPC ................ *G01F 1/584* (2013.01); *G01F 1/588* (2013.01); *G01F 15/00* (2013.01); *G01F 15/14* (2013.01)

(58) Field of Classification Search
None
See application file for complete search history.

(56) References Cited

U.S. PATENT DOCUMENTS

| 6,092,428 A | 7/2000 | Brockhaus |
| 9,243,941 B2 * | 1/2016 | Reichart ................. G01F 1/588 |
| 2010/0132479 A1 | 6/2010 | van Willigen |

FOREIGN PATENT DOCUMENTS

| DE | 19637716 C1 | 4/1998 |
| DE | 102009045274 A1 | 4/2011 |
| WO | 2005124292 A1 | 12/2005 |

OTHER PUBLICATIONS

International Search Report; PCT/EP2013/065476; International Filing Date: Jul. 23, 2013; IFM Electronic GmbH; 2 pgs.

*Primary Examiner* — Harshad R Patel
(74) *Attorney, Agent, or Firm* — Schmeiser, Olsen & Watts, LLP

(57) ABSTRACT

A magnetoinductive flowmeter for measuring the flow rate of a flowing, conductive medium with a capacitive measuring apparatus for detecting empty pipes is provided. In order to improve the detection of empty pipes and, in particular, the capacitive coupling to the medium, the invention provides for the measuring apparatus for detecting empty pipes to comprise a sheet-like electrode in each case and a counterelectrode which form a measurement capacitance $C_{Mess}$ which is dependent on the medium and on the degree of filling of the measuring tube; for the measuring tube to have a wall thickness which is reduced in order to maximize the measurement capacitance $C_{Mess}$ at least in the region of the electrode and the counterelectrode; and for the measuring tube to be surrounded by a metal supporting housing, wherein, in order to maintain the pressure resistance of the measuring tube, a hollow-walled supporting body for minimizing the influence of parasitic capacitances on the measurement capacitance $C_{Mess}$ is arranged in each case in the region of the reduced wall thickness between the electrode and the inner wall of the supporting housing and between the counterelectrode and the inner wall of the supporting housing and supports the measuring tube against the supporting housing in each case.

9 Claims, 3 Drawing Sheets

Figure 1:
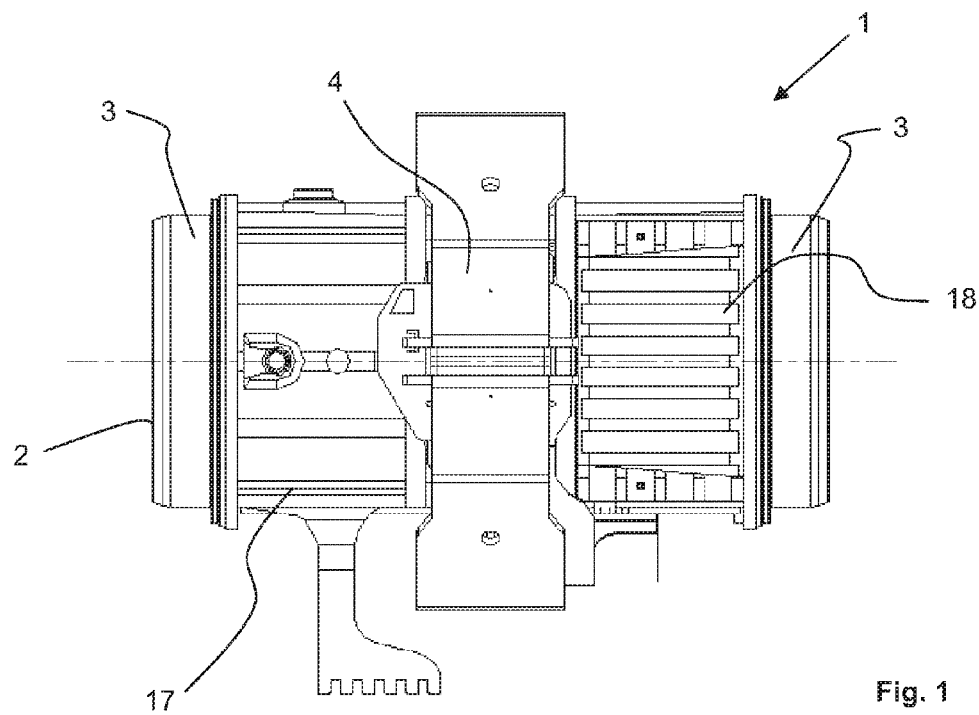

MAGNETIC INDUCTIVE FLOW METER HAVING CAPACITIVE MEASURING DEVICE FOR EMPTY PIPE DETECTION

CROSS-REFERENCE TO RELATED APPLICATION

This application claims priority to PCT Application No. PCT/EP2013/065476, having a filing date of Jul. 23, 2013, based on DE 10 2012 213 507.3 filed Jul. 31, 2012, the entire contents of which are hereby incorporated by reference.

FIELD OF TECHNOLOGY

The following relates to a magnetic inductive flow meter for measuring the flow of a flowing, conductive medium.

BACKGROUND

Magnetic inductive flow meters, whose mode of operation is based on the principle of electromagnetic induction (=Faraday's law of induction), have been known for many years and are extensively being used in industrial measurement engineering. According to the law of induction, an electric field strength that is perpendicular to the direction of flow and perpendicular to the magnetic field is generated in a flowing medium, which is carrying charge carriers, that flows through a magnetic field. In magnetic inductive flow meters, the law of induction is exploited in such a way that a magnetic field is generated by means of a magnetic field generating device, which commonly has two energized magnetic coils, the magnetic field being passed at least in part through the measuring tube, wherein the magnetic field that is generated has at least one component that is perpendicular to the direction of flow. Within the magnetic field, every volume element of the flowing medium, which passes through the magnetic field and has a specific number of charge carriers with the field strength that arises in this volume element, contributes to a measuring voltage that can be tapped by the electrodes.

Since the induced voltage tapped by means of the electrodes is proportional to the rate of flow of the medium averaged over the cross section of the measuring tube, the volume flow can be directly determined from the measured voltage if the diameter of the measuring tube is known. The only prerequisite for the use of a magnetic inductive flow meter is a minimum conductivity of the medium. In addition, it must be ensured that the measuring tube is filled with medium so that the level of the medium is at least higher than that of the measuring electrodes. As, however, a substantial error can occur depending on the fill level, if the measuring tubes are not completely filled, magnetic inductive flow meters are primarily optimally suited for uses in which the measuring tube is completely filled. For this reason, in practice, in most cases magnetic inductive flow meters have a measuring device for empty pipe detection, which indicate to the user when the fill level has dropped so much that the measured value can no longer be determined with the required degree of accuracy. This may already be the case, for example, in the case of a measuring tube that is only two-thirds filled so that the measuring devices used in practice for "empty pipe detection" will not only generate a signal when the measuring tube is actually "empty".

If a magnetic inductive flow meter should also display a measured value when it is not completely filled, the degree to which it is filled must also be known so that the measured value can be corrected. Such correction values and the determination thereof are discussed in DE 196 37 716 C1 for example. To this end, a test signal voltage is applied to a pair of electrodes that are located opposite one another and a reaction voltage generated thereby on a second pair of electrodes that are located opposite one another is measured, wherein the two pairs of electrodes are coupled with the medium. A correction value is determined on the basis of the determined relationship between the reaction voltage and the test signal voltage, wherein corresponding correction values are first empirically determined and stored in a memory.

The degree to which the measuring tube is filled can also be capacitively determined according to DE 196 55 107 C2. In so doing, the two electrodes for measuring the flow of the medium are capacitively coupled with the medium, wherein the electrodes form a capacitor with the medium as a dielectric medium. In so doing, on the one hand, the voltage induced in the medium is tapped as a measure for the speed of flow of the medium by means of the two electrodes, and, on the other hand, the electrodes are supplied with an alternating voltage, and the capacitance between the electrodes is determined by means of a control and evaluation circuit as a measure of the percentage of the conductive medium in the measuring tube.

SUMMARY

An aspect relates to a magnetic inductive flow meter, in which the empty pipe detection and thereby, in particular, the capacitive coupling to the medium is improved.

The above mentioned task is attained according to embodiments of the present invention. Advantageous embodiments are defined in the dependent claims.

According to embodiments of the present invention, on the one hand, it is provided that the measuring device for empty pipe detection respectively comprises an electrode and a counter electrode, each of which has a sheet-like design, which form a measurement capacity $C_{Mess}$ that is a function of the medium and of the fill level of the measuring tube. Because the electrode and the counter electrode have a sheet-like design, on the one hand, the capacitance between the two electrodes is increased, and, on the other hand, a high transmission power can be coupled into the medium, which results in a greater measurement signal to be evaluated.

Moreover, according to embodiments of the present invention, it is provided that the measuring tube has a reduced wall thickness at least in the region of the electrode and of the counter electrode in order to maximize the measurement capacity $C_{Mess}$. According to an advantageous embodiment, the wall thickness in this region is less than 5 mm; preferentially approximately 2 mm. Due to the reduced wall thickness, the electrical field of the electrode can be better coupled into the interior of the measuring tube where the medium is located. Since this effect is only related to the electrical field of the electrodes, it is sufficient if the measuring tube has a thin-walled design only in the region of the electrode and of the counter electrode.

In addition, in the flow meter according to embodiments of the present invention, it is provided that the measuring tube is encased by a supportive housing made of metal.

Finally, according to embodiments of the present invention, a support element having a hollow-walled design is arranged in the region of the reduced wall thickness both between the electrode and the inner wall of the supportive housing and between the counter electrode and the inner wall of the supportive housing in each case in order to minimize the influence of parasitic capacitances on the measurement capacity $C_{Mess}$. Parasitic capacitances refer to the percentage of the electric field generated by the electrodes that is not directed into the interior of the measuring tube and therefore does not directly contribute in determining the filling level of the measuring tube, but which is essentially directed outward in the direction of the supportive housing.

As a result, the measuring tube is braced against the supportive housing by the support element in the region of the electrodes in each case. Due to the arrangement of the support element between the thin-walled region of the measuring tube and of the supportive housing, the compressive strength of the measuring tube is increased or, respectively, maintained so that the magnetic inductive flow meter can be used even in the case of very high pressures despite the partially very thin-walled measuring tube. A common nominal pressure is 16 bar, wherein pressure peaks of up to 64 bar, thus four times the nominal pressure, are definitely possible, which the measuring device or, respectively, the measuring tube must withstand.

The hollow-walled design of the support elements thereby makes it possible to achieve the best possible coupling of the electric field of the electrodes into the interior of the measuring tube and the greatest possible isolation against the external environment.

An advantageous embodiment of the invention provides that the measuring tube is made of a thermoplastic, preferentially of polyetheretherketone (PEEK), perfluoroalkoxy alkane or, respectively, perfluoroalkoxy alkane polymers (PFA), polyvinylidene fluoride (PVDF), or polyphenylene sulfide (PPS), or of a glass fiber reinforced plastic, and that the support element is made of the same or of a similar material as the measuring tube. The material of the measuring tube should, in particular, be characterized by a high degree of stability in order to ensure the necessary compressive strength. At the same time, in individual areas of application, such as the food and pharmaceutical industries, there are hygienic requirements that substantially limit the selection of materials that can be used. The specified materials, in particular, represent an optimum in terms of stability, dielectric constant and fulfillment of hygienic requirements.

According to a further advantageous embodiment of the invention, a strut is arranged inside the support element in order to ensure the stability vis-à-vis pressure peaks because, as explained above, the highest possible degree of isolation against the external environment is to be achieved via the hollow-walled design of the support element, as the interior of the support element is filled with air and therefore has an $\in_r$ of 1 or, respectively, nearly 1. This inner space is only partially filled with material by means of a strut, whose $\in_r > 1$. The design of the strut must therefore reach an optimum balance between strength or, respectively, stability and a change in the $\in_r$ value.

According to a further especially advantageous embodiment of the magnetic inductive flow meter according to embodiments of the present invention, the electrode and the counter electrode for empty pipe detection are spatially separated from the magnetic field generating device and from the measuring electrodes to measure the fluid flow of the medium, so that the reciprocal influence of the two measurement systems on one another is minimized. At the same time, the electrode and the counter electrode for empty pipe detection on the one side and the magnetic field generating device on the other side are preferentially arranged consecutively in the longitudinal direction of the measuring tube.

In order to protect the thin, sheet-like electrodes from damage, in a further advantageous embodiment, it is provided that a protective pad made of an elastic material, preferentially rubber, is arranged between each of the electrodes and the support elements.

As already explained, the support element has a hollow-walled design and is filled with air. When the entire measuring device is encapsulated in a casting resin, for example in order to protect it against vibrations and shocks, it must be ensured that the encapsulation material does not flow into the hollow chambers of the support elements. For this reason, a cap is provided on each of the two front faces, which cap is preferentially welded thereon by means of ultrasound.

BRIEF DESCRIPTION

Figure 2:
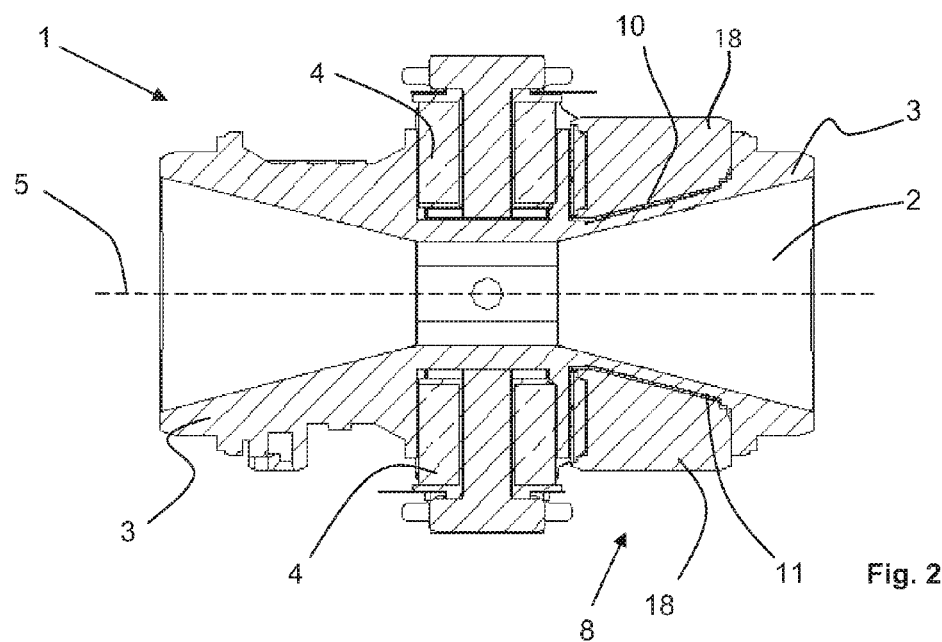
Figure 3:
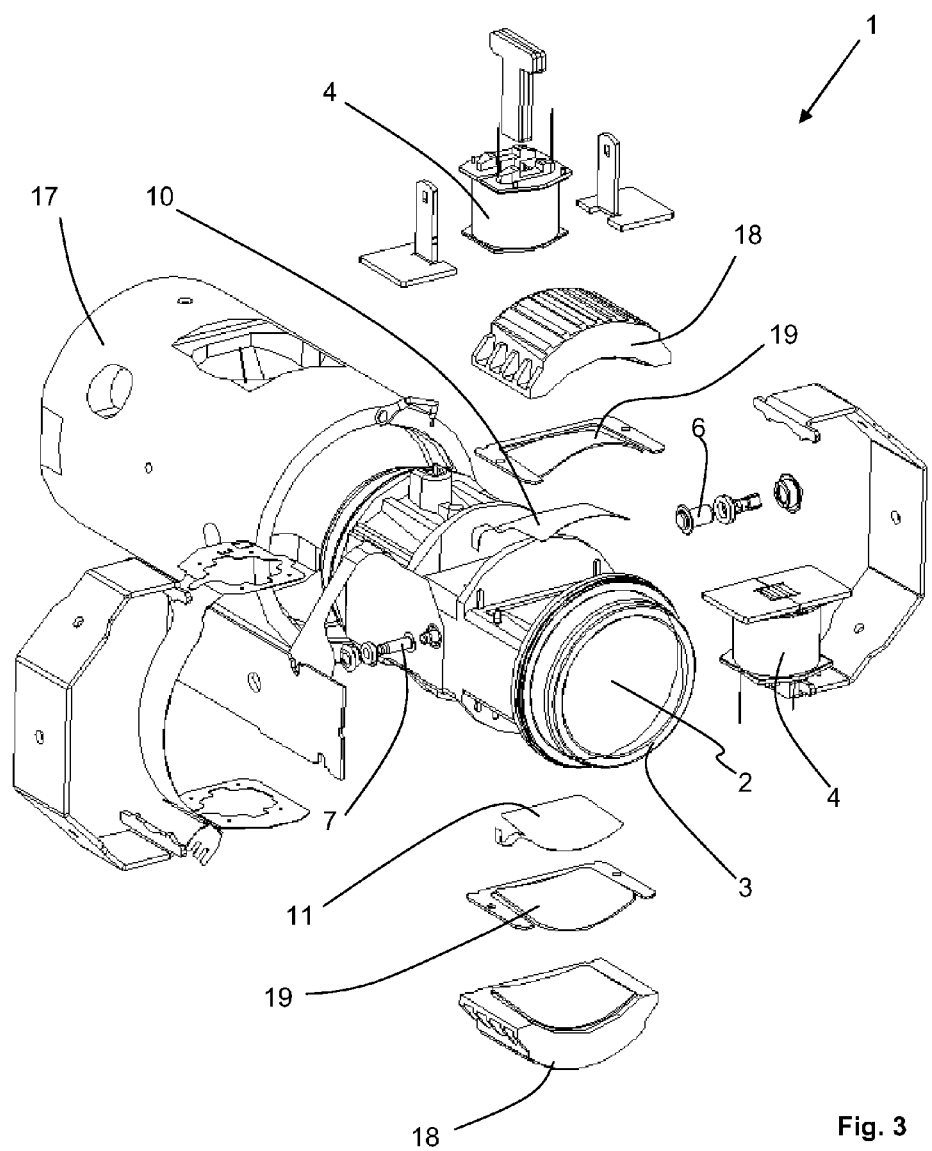
Figure 4:
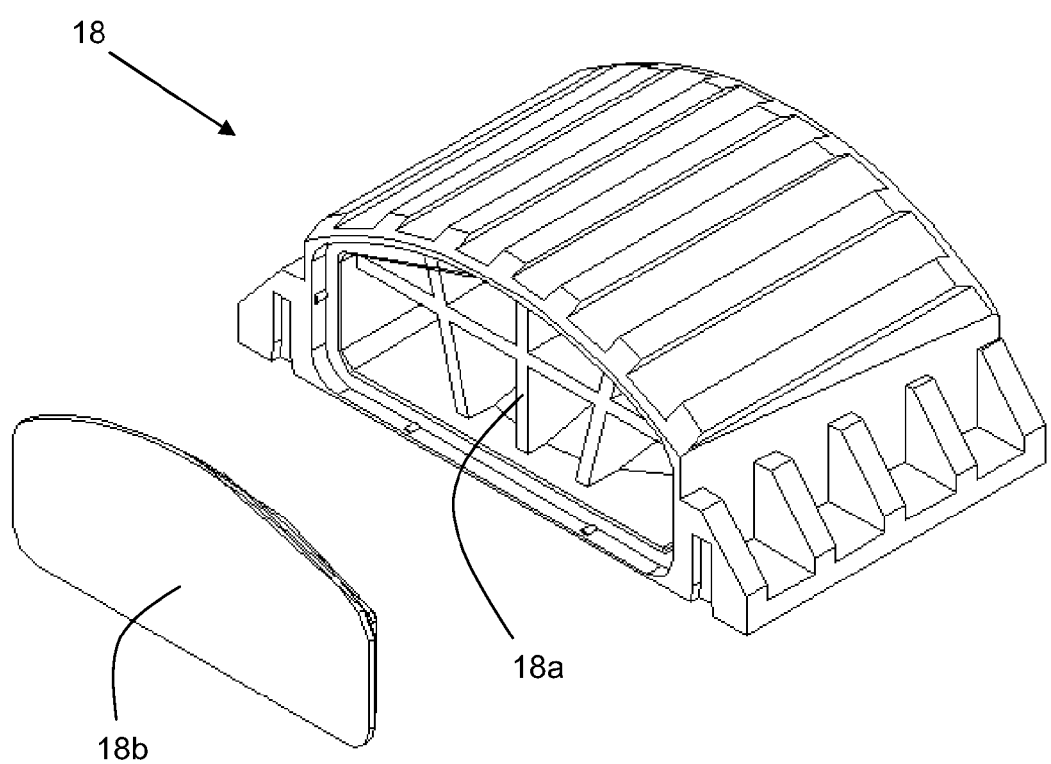

Some of the embodiments will be described in detail, with reference to the following figures, wherein like designations denote like members, wherein:

FIG. 1 a side view of a preferred embodiment of a magnetic inductive flow meter;

FIG. 2 a longitudinal section of the magnetic inductive flow meter according to FIG. 1;

FIG. 3 an exploded view of the magnetic inductive flow meter according to FIG. 1; and FIG. 4 a perspective view of the support element and the associated cap.

DETAILED DESCRIPTION

FIGS. 1 to 3 show a preferred embodiment of a magnetic inductive flow meter 1 according to embodiments of the present invention for measuring the flow of a flowing, conductive medium 2 in a measuring tube 3. In order to measure the flow of the medium 2, a magnetic field generating device is provided that has two coils 4, which are externally mounted on opposite sides on the measuring tube 3, and which are supplied with power by a current generator that is not shown here. The magnetic field generating device or, respectively, the coils 4 generate a magnetic field, which penetrates the measuring tube 3 essentially perpendicularly to the longitudinal axis 5 thereof. In addition, two measuring electrodes 6, 7 are also provided, which are galvanically coupled with the medium 2 and tap a measuring voltage that is induced in the flowing medium 2. Besides the galvanic coupling of the measuring electrodes 6, 7 with the medium 2 provided in this case, a capacitive coupling is also essentially possible.

Apart from the known measuring device for measuring the flow of the flowing medium 2 described above, the magnetic inductive flow meter 1 also has a measuring device 8 for empty pipe detection. This measuring device 8 is preferentially designed as an admittance measuring device and has an electrode 10, a counter electrode 11, a first alternating signal source (not shown) and an evaluation unit (not shown).

As is, in particular, visible in FIGS. 2 and 3, the electrode 10 and the counter electrode 11 have a sheet-like design and are arranged opposite one another on the outer surface of the measuring tube 3, wherein the electrode 10 is arranged above, and the counter electrode 11 is arranged below the longitudinal axis 5 of the measuring tube 3.

In the preferred embodiment of the flow meter 1 according to embodiments of the present invention shown in FIGS. 1 to 3, not only is the electrode 10 connected to a first alternating signal source, but the counter electrode 11 is likewise connected to a second alternating signal source, so that both electrodes 10, 11 can be operated as active electrodes that are controlled by the respective alternating signal sources. Both alternating signal sources are connected to a common reference potential, which is connected to the outer, metallic supportive housing 17 of the magnetic inductive flow meter 1 via a capacitor.

If both electrodes 10, 11 are connected to an AC signal source, this offers the advantage that the flow meter 1 [TN: Verb missing in source.] regardless of whether the (active) electrode 10 is located above or below the longitudinal axis 5 of the measuring tube 3.

If only one electrode is connected to an alternating signal source, this electrode 10 must be arranged above the longitudinal axis 5 of the measuring tube 3 in order to achieve a good signal processing. If this active electrode 10 is located below the longitudinal axis 5, the signal profile is substantially worse and therefore the signal evaluation is significantly more difficult.

Since the measuring tube 3, which is made of a thermoplastic, in particular polyetheretherketone (PEEK), only has a very small wall thickness measuring a few millimeters, preferentially approximately 2 to 3 mm, in the region of the electrodes 10, 11, a hollow-walled support element 18 is arranged between the electrodes 10 and 11 and the inner wall of the supportive housing 17 in each case in order to ensure the sufficient compressive strength of the measuring tube 3. In order to protect the thin, sheet-like electrodes 10, 11 from damage, a protective pad 19 made of an elastic material, rubber, for example, is also arranged between each of the electrodes 10, 11 and the support elements 18. By means of the arrangement of the support elements 18, which is preferentially made of the same or of a similar material as the measuring tube 3, not only is the mechanical stability of the measuring tube 3 increased, but the coupling of the electric field emitted by the electrodes 10, 11 to the medium 2 is also increased. To this end, the hollow-walled support elements 18 may have a honeycomb design, for example.

In addition, it is evident from FIGS. 2 and 3 that the electrode 10 and the counter electrode 11 on the opposite side are spatially separated from the two coils 4 of the magnetic field generating device and the measuring electrodes 6, 7 in such a way that the electrodes 10, 11 on the one side, and the coils 4 as well as the measuring electrodes 6, 7 on the other side are consecutively arranged in the longitudinal direction of the measuring tube 3.

FIG. 4 shows the support element 18, having a hollow-walled design, as well as the cap 18b for sealing off the interior. In order to improve the stability, struts 18a are arranged inside said support element. As a rule, however, it is necessary to provide as many struts as needed and as few struts as possible in order to ensure the stability or, respectively, the compressive strength, and at the same time, to keep the amount of air in the interior of the support element as large as possible so that the $\in_r$ value is as close to 1 as possible.

This cap 18b is provided so that, when encapsulating the measuring device 1, for example in order to protect it against vibration and shocks, it is ensured that the encapsulation material does not flow into the hollow chambers of the support elements 18. The cap 18b is thereby preferentially connected to the support element 18 by means of ultrasound welding.

The invention claimed is:

1. A magnetic inductive flow meter for measuring the flow of a flowing, conductive medium having a measuring tube made of a non-conductive material, having a magnetic field generating device for generating a magnetic field, in particular an alternating magnetic field, which penetrates the measuring tube essentially perpendicularly to the longitudinal axis of the measuring tube, having two measuring electrodes, in particular measuring electrodes that are galvanically coupled with the medium in order to tap a measuring voltage that is induced in the flowing medium, and having a capacitive measuring device for empty pipe detection, wherein the measuring electrodes are arranged along a connecting line that runs perpendicularly to the longitudinal axis of the measuring tube and perpendicular to the direction of the magnetic field, and wherein the compressive strength of the measuring tube is determined by the wall thickness or, respectively, the material thereof, wherein the measuring device for empty pipe detection comprises an electrode and a counter electrode, each of which has a sheet-like design, which form a measurement capacity $C_{Mess}$ that is a function of the medium and of the fill level of the measuring tube;

the measuring tube has a reduced wall thickness at least in the region of the electrode and of the counter electrode in order to maximize the measurement capacity $C_{Mess}$;

that the measuring tube is encased by a supportive housing made of metal, wherein in order to maintain the compressive strength of the measuring tube in the region of the reduced wall thickness between the electrode and the inner wall of the supportive housing, and between the counter electrode and the inner wall of the supportive housing, a support element having a hollow-walled design is arranged in each case in order to minimize the influence of parasitic capacitances on the measurement capacity $C_{Mess}$, which support element in each case braces the measuring tube against the supportive housing.

2. The magnetic inductive flow meter according to claim 1, characterized in that the measuring tube is made out of a thermoplastic, including one of polyetheretherketone (PEEK), polyphenylene sulfide (PPS), perfluoroalkoxy alkane (PFA), polyvinylidene fluoride (PVDF), or of a glass fiber reinforced plastic, and in that the support element is made of the same or a similar material as the measuring tube.

3. The magnetic inductive flow meter according to claim 1, wherein a strut is arranged inside the support element in order to increase the compressive strength.

4. The magnetic inductive flow meter according to claim 1, wherein the electrode the counter electrode are spatially separated from the magnetic field generating device and from the measuring electrodes; in particular the electrode and the counter electrode on the one side, and the magnetic field generating device on the other side are consecutively arranged in the longitudinal direction of the measuring tube.

5. The magnetic inductive flow meter according to claim 1, wherein a protective pad made of an elastic material is arranged between each of the electrodes and the support elements.

6. The magnetic inductive flow meter according to claim 5, wherein the elastic material is made of rubber.

7. The magnetic inductive flow meter according to claim 1, wherein the measuring tube has a wall thickness of less than 5 mm in the region of the measuring device for empty pipe detection.

8. The magnetic inductive flow meter according to claim 7, wherein the wall thickness is 2 mm to 3 mm.

9. The magnetic inductive flow meter according to claim 1, wherein the support element has a cap on each of end faces of the support element.

* * * * *